3,841,947
METHOD AND APPARATUS FOR CONTINUOUS WELDING OF PLASTICS SHEETS, IN PARTICULAR FOR USE IN THE MANUFACTURE OF EXPLORATORY BALLOONS

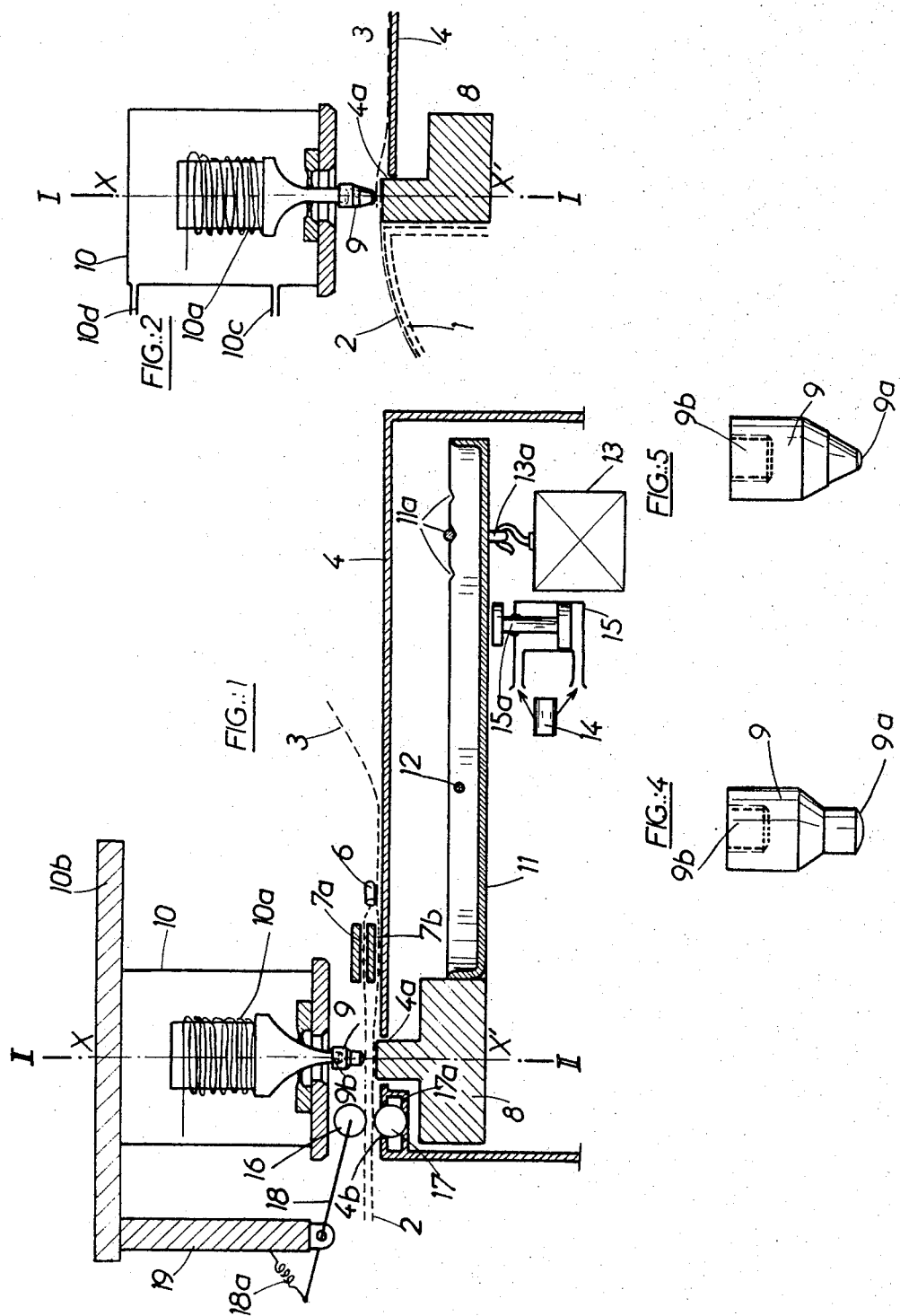

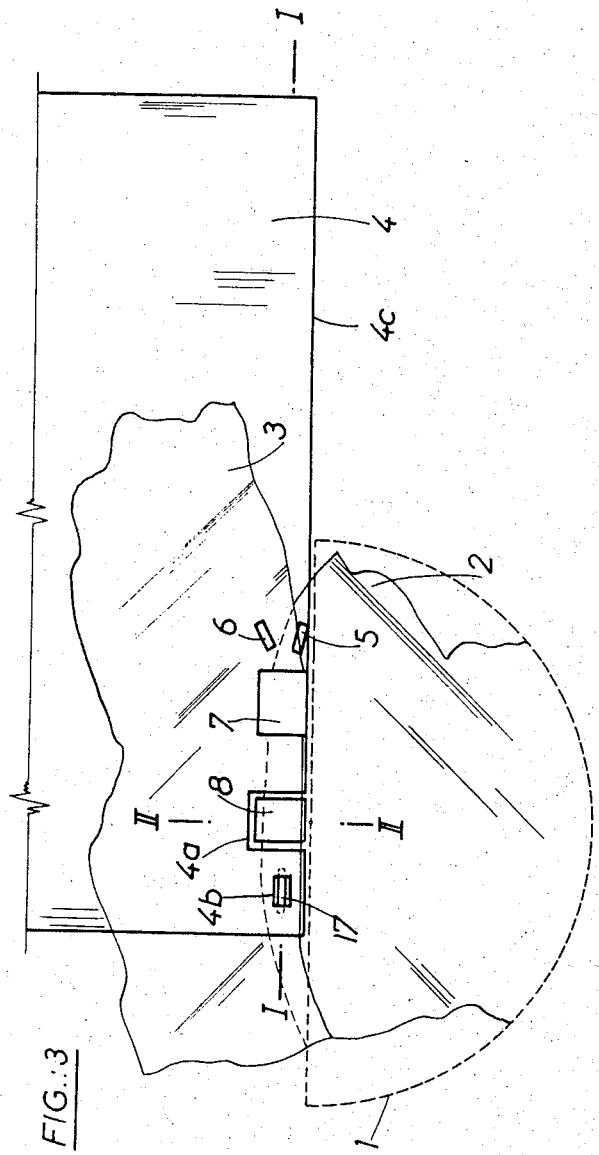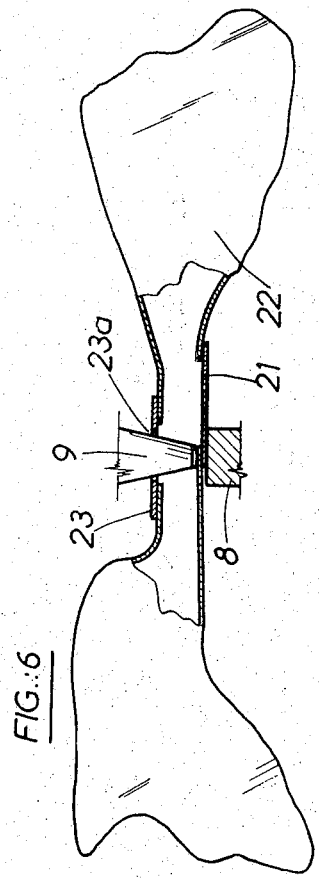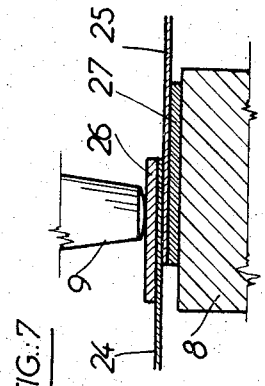

Maurice Henri Bocquet, Massy, and Michel Chatain, Bourg-la-Reine, France, assignors to Centre National d'Etudes Spatiales, Paris, France Continuation of abandoned application Ser. No. 868,559, Oct. 22, 1969, which is a continuation-in-part of application Ser. No. 626,595, Mar. 28, 1967, now Patent No. 3,533,865. This application Mar. 20, 1972, Ser. No. 236,330

Claims priority, application France, Oct. 24, 1968, 171,293

Int. Cl. B32b *31/08, 31/16*
U.S. Cl. 156—580
6 Claims

ABSTRACT OF THE DISCLOSURE

A balloon made of a plurality of gores of film of plastic material such as polyethylene terephthalate ultrasonically welded together edge to edge to form an envelope with two polar apertures which are then sealed by ultrasonically welding a pair of polar caps. The second cap is conveniently welded through a hole provided in the first cap to receive a valve for the balloon. Ultrasonic welding of the very thin film is made easier by inserting paper tapes between the tips of welding tool and anvil and the material being welded.

---

This is a continuation of Ser. No. 868,559, filed Oct. 22, 1969, now abandoned. The invention relates to an improvement in or modification of the invention claimed and described in application Ser. No. 626,595, now U.S. Pat. No. 3,533,865, which is the parent of continuation-in-part application Ser. No. 868,559.

In our above-mentioned patent Application, a method of a device for effecting continuous ultrasonic welding has been described by means of which it is possible in particlular to produce stratospheric balloons from very thin sheets of plastic material such as polyethylene terephtalate.

The method described in our above-mentioned patent Application, applied to the manufacture of a balloon, an envelope or a similar object, consists in placing two sheets of material edge-to-edge with a small degree of overlap, and of soldering them together longitudinally using ultrasonic techniques, and of then shifting the assembly laterally in order to proceed with the welding of another sheet along the edge of said assembly, and so on until the final welding of the free edges of the first and last sheets. In order, more particularly, to manufacture a balloon, the sheets take the form of gores which are welded together along lines which will ultimately be meridian lines of the balloon, the balloon being finished off by fitting two polar caps of the same material as the gores and welding these continuously by the same ultrasonic techniques, along parallels of the balloon in slight overlap with the terminal edges of the welded gores.

In one embodiment described in our above-mentioned patent Application, after having welded the first cap in position, the second is also welded in position using as the welding anvil an appropriate metal element located inside the envelop, for example a balloon valve head.

In accordance with the present invention, the welding of the second cap is effected through an opening formed in the first cap, which opening is designed to ultimately receive the balloon valve.

The welding device described in our above-mentional patent application comprises a welding head the chief element of which is a tool (called an electrode) which is supplied with power from a magnetostrictive arrangement and carries out the welding together of the strips of plastic material strapped between it and an anvil. The already welded gores of the balloon are placed upon a hemispherical support which is caused to rotate and the edge of which is tangential to the anvil, whilst the sheet which is to be welded is supported by a table equipped with a guide arrangement for the edges of the sheets downstream of the welding head.

In a particular embodiment described in our above-mentioned patent application, the anvil is fixed and the welding head is movable by the action of a double-acting ram, this making it possible to retract the tool from the anvil and also to move it into contcat therewith under a constant and controllable pressure. The drive element is a roller carried by an arm connected to the welding head through a spring. The welding tool has an aluminium tip. The cooling of this tool and of the magnetostrictive assembly is effected by means of an air circuit.

It has now been determined, in the course of trials, that the jack which produces vertical displacement of the welding head and forces the tool against the anvil, prevents this mobile assembly from properly following the small vertical displacements which it must carry out during welding, so that the pressure exerted by the tool undergoes slight variations. The quality of the weld is therefore not strictly uniform from one end to the other.

In accordance with a further feature of the present invention, this drawback is overcome by resorting to gravitational means to produce the welding pressure between tool and anvil, and by parting the tool and the anvil from one another between the welding passes in order to enable the sheets being welded together to be manipulated by means of a double-acting jack acting against the gravitational force.

Preferably, the welding head will be fixed in the translatory mode, that is to say, so that it cannot move towards or away from the table; instead the anvil is movable to enable it to be applied against the tool by gravitational force and to be removed therefrom by the operation of the the double-acting ram. In one embodiment, the anvil is carried by a rocker with an adjustable counterweight which forces it against the tool. The said counterweight acts on the rocker by contact in such fashion that during a first phase, the anvil approaches the tool rapidly and in a second phase more slowly; at the end of its travel, contact is broken and the counterweight acts simply on the rocker in order to produce the welding pressure.

In accordance with another feature of the invention, the driving of the welded sheets or films downstream of the welding head is effected by two rollers in contact with opposite faces of the sheets, at least one of which rollers is driven. The welding of balloons or sheaths requires that the bottom roller is not connected to the frame of the welding head by an arm which would be in the way. On the other hand, this bottom roller, which has to resist the pressure of the top roller required to drive the welded sheets, must not transmit this pressure to the anvil since this would disturb the welding operation. Accordingly, the bottom roller is separated from the welding head and the anvil; it is carried by a component which at least partially surrounds the anvil without being in contact therewith.

In accordance with another feature, the tool does not have a separate tip but is a one-piece component, preferably of stainless-steel or titanium. That of its faces located opposite the anvil takes the form of a convex slipper having curvature both in the direction of its own length, which is arranged along the line of the weld which is to be produced, and in the direction of its own width, which is quite small (in the order of some few mm.), the width dimension being disposed perpendicularly in relation to said line of weld.

This kind of tool must be aligned in the direction of feed of the sheets being welded. However, it may be necessary for reasons of size, to execute welds in a direction other than that defined by the edge of the table. The tool will then preferably be mounted to pivot about a vertical axis, and the top drive roller of the weld sheets likewise.

A variant embodiment of the invention is one in which the assembly of welding head and roller is movable about a vertical axis.

Welding trials on large lengths of material have indicated that the uniformity of the weld can only be obtained if the tool maintains constant efficiency during the whole of the operation and therefore does not become overheated. A simple air-cooling arrangement will not suffice in this context. In accordance with a still further feature of the invention, the temperature of the tool is kept strictly constant by means of a circulatory water system or system using some other cooling fluid of high specific heat.

The above improvements make it possible to operate the welding equipment for prolonged periods and yet continuously produce welds of good quality. A device comprising these improvements can be used not only for the manufacture of balloons, sheaths or envelopes, but also makes it possible to carry out all kinds of continuous welds in particular the flat welding of strips of plastic material over very substantial lengths. In order to carry out the latter kind of operation, it is merely necessary to replace the hemispherical rotating support used for balloons, by a simple table, the strips or bands which are being welded together advantageously being routed over the tables in the conventional way by conveyor belts or feed rollers.

It has not been possible hitherto effectively to weld sheets of plastic material smaller in thickness than about $25\mu$. It has now been discovered, however, in the course of investigations, that it is possible continuously to solder sheets much thinner than this by ultrasonic techniques by placing, at either side of the sheets being soldered together, strips of a material which will not weld to said sheets, for example, paper, one of said strips being in contact with the anvil and the other with the tool. This method also forms part of the present invention.

The description which follows with reference to the accompanying drawings will indicate by way of non-limitative example how the invention may be carried into practice.

In the drawing:

FIG. 1 illustrates a welding device in accordance with the invention, seen in section on the line I—I of FIGS. 2 and 3;

FIG. 2 is a sectional view on the line II—II of FIGS. 1 and 3;

FIG. 3 is a plan view of the device, the welding head being removed;

FIGS. 4 and 5 are fragmentary views which are respectively similar to FIGS. 1 and 2, showing the welding tool on a larger scale;

FIG. 6 is a schematic view illustrating the design of the weld of the second cap of a balloon;

FIG. 7 is a fragmentary view similar to that of FIG. 2, showing on a larger scale the welding of very thin sheets.

The device illustrated in FIGS. 1 to 3 is similar, broadly speaking, to that described in our above-mentioned patent application. The rotating hemispherical support 1, which is used chiefly for the manufacture of balloons, is illustrated in broken line. The already welded part 2 of the balloon is placed over said support 1, whilst a sheet 3 yet to be welded in position is placed on the table 4. The edges of said part 2 and said sheet 3 are driven by rollers 5 and 6 located in convergent planes in grooves 7a and 7b formed in a guide arrangement 7. The slightly overlapping superimposed edges pass between an anvil 8 and a tool 9 which produces the weld, and the welded part is driven by means which will be described hereinafter. The welding head is marked by the reference 10 and the reference 10a indicates the magnetostrictive assembly.

The welding head 10 is fixed in height in relation to the table 4, i.e. it cannot move towards or away from the same, however, it can be rotated about the vertical axes XX' of the tool 9 for a purpose which will be explained hereinafter. The anvil 8 moves in a slot 4a in the table 4 and is carried by a side arm 11 pivoting about a horizontal axis 12. The arm 11 contains slots 11a in which can engage a ring 13a carrying a counterweight 13 after the manner of a steel-yard. Thus, the welding pressure, that is to say the pressure under which the sheets 1, 2 are trapped between the anvil and the tool during welding, can be regulated by appropriately adjusting the mass of the counterweight 13 and effecting an appropriate selection of the slots 11a in which the ring 13a is engaged.

In order to part the anvil from the tool between welding passes, a valve 14 is used to operate a pneumatic double-acting jack 15 in order that the end of its piston rod 15a lifts the arm 11 and causes it to pivot, raising the counterweight 13. If the jack 15 is then operated in the other direction, by means of the valve 14, the arm 11 will first of all pivot rapidly, and then more slowly, under the action of the counterweight, in order to produce a rapid approach on the part of the anvil 8, followed by a phase of slower approach. At the end of its travel, the piston rod 15a will be out of contact with the arm 11 and thus enables the counterweight to act alone to produce the welding pressure.

The welded sheets are driven, downstream of the welding head 10, by a pair of rollers 16, 17, in the form of wheels having rubber peripheries bearing, opposite one another, on the top face of the sheet 3 and the bottom face of the sheet 2, respectively. The axle of the bottom wheel 17 is fixed to a support 17a integral with the table 4 and its rim projects through a slot 4b in said table. The axle of the top wheel 16 is fixed to one end of a lever 18 articulated to an arm 19 fixed to the frame 10b of the welding head, the other end of which lever is urged by a spring 18a towards the arm 19. The wheel 16 is thus elastically urged towards the wheel 17. One of these two wheels is positively driven, the wheel 16 for example being driven by a flexible transmission as in the manner described in our above-mentioned patent application.

The temperature of the welding head 10 and tool 9 is maintained strictly constant by a circulatory water-cooling system the input of which is marked 10c and the output 10d.

The tool 9 is illustrated in greater detail in FIGS. 4 and 5. It is substantially wedge-shaped, its bottom face 9a forming a convex slipper two or three mm. wide and six to eight mm. long, curved in both longitudinal and transverse directions as the drawing shows. The welding head 10 has a screwed stem 9b which screws into the tool 9 so that the longitudinal axis of the slipper 9a is located in the plane of the wheel 16.

In order to carry out welding of the gores of a balloon, the welding head 10 is placed in the position illustrated in FIGS. 1 and 2, i.e. with the longitudinal axis of the slipper 9a parallel to the edge 4c of the table 4 (FIG. 3), in which table the slot 4a is formed. This machine can be used to carry out other kinds of welds, for example flat welding of strips of plastic material. For this purpose, all that is necessary is to replace the hemispherical support 1 by a second table located against the edge 4c of the table 4, the whole of the rest of the equipment being used.

In order to carry out welds in a direction other than that of the edge of the table, the assembly of frame 10b, welding head 10 and supported arm 19, is rotated around the axis XX'.

FIG. 6 illustrates the welding of the second cap 21 of a balloon 22, through an orifice 23a formed in the cap 23 already welded in position in the manner described in our above-mentioned patent application. Those edges of the balloon and the cap 21 which are to be welded together, are trapped between an anvil 8a and the tool 9, the latter passing through the orifice 23a. After the execution of the weld, in the conventional way, the balloon valve is fixed in the orifice 23a. It would be within the scope of the present invention to trap the parts to be welded together, between the tool 9 and an anvil, the former remaining outside the balloon and the latter passing through the orifice 23a. It would also be possible, in the arrangement illustrated, to replace the anvil 8a by an anvil rotating about an axis parallel to the axis XX' of the tool but offset in relation thereto in a manner described in our above-mentioned patent application in the context of the welding of the first cap.

FIG. 7 illustrates the welding of two very this sheets of plastic material 24, 25. Two respective sheets of paper 26, 27 are placed upon the top face of the sheet 4 and the bottom face of the sheet 5, along those of their edges which are to be welded together. Then, these edges are arranged in such fashion that the top face of sheet 25 slightly overlaps the bottom face of the sheet 24 and the whole assembly is passed between the anvil 8 and tool 9 in the manner already described. After the execution of the weld, the strips of paper 26 and 27 are removed, these not being weldable to the sheets. The strips of paper can be placed in the correct position before the sheet pass between anvil and tool, or may be preliminarily fixed to the edges of the sheets which are to be welded together by sticking them there. To this end, adhesive tapes can be used; the latter are particularly easy to remove from the sheets after welding.

It has proved possible, with this process, to effect continuous ultrasonic welding of sheets of polyethylene terephthalate 9μ in thickness, using strips 26, 27 of roneo-type paper. However, it is obviously within the scope of the invention to replace the strips of paper by sheets of other materials which will not be ultrasonically welded to the plastics material of which the basic sheets involved in the construction are made.

What is claimed is:

1. A device for continuously ultrasonically welding together overlapping edges of very thin films of thermoplastic material, comprising a first operative component in the form of an anvil, a second operative component in the form of an ultrasonic welding head with a welding tool opposite and adjacent said anvil, said operative components being movable relative to each other towards and away from each other, means for guiding said edges in overlapping longitudinal relation between said operative components, yieldable clamping means responsive solely to gravity for continuously and flexibly urging one of said operative components towards the other with a constant force in order to uniformly and continuously clamp the overlapping edges between said operative components, means for continuously supplying power to said welding tool in order to weld together the clamped overlapping edges, an enclosure in which said power supply means is housed, means for circulating coolant liquid through said enclosure and over said power supply means immersed therein to keep the temperature of said tool constant, and drive means for continuously driving at uniform speed the welded overlapping edges longitudinally away from said operative components.

2. A device according to claim 1, wherein said gravity responsive yieldable clamping means is adjustable to modify the magnitude of said constant force.

3. A device according to claim 2, wherein said yieldable clamping means comprises means for gravitationally pivoting one of said operative components relative to the other about a fulcrum, said gravitational pivoting means including an adjustably weighted lever pivoted on said fulcrum and bearing said one operative component.

4. A device according to claim 3, wherein said weighted lever comprises an adjustably positionable weight acting as a counterweight with respect to said one operative component.

5. A device according to claim 4, wherein said one operative component is said first component in the form of an anvil, whereas said second operative component in the form of a welding head is stationary.

6. A device according to claim 1, wherein said first operative component in the form of an anvil is movable whereas said second operative component in the form of an ultrasonic welding head is stationary, wherein said power supply means and said coolant liquid circulating means are integral portions of said stationary welding head.

References Cited
UNITED STATES PATENTS

| | | | |
|---|---|---|---|
| 3,438,428 | 4/1969 | Balamuth et al. | 156—73 |
| 3,445,307 | 5/1969 | Balamuth et al. | 156—73 |
| 3,657,802 | 4/1972 | Delmas | 156—73 |
| 3,388,848 | 6/1968 | Youmans et al. | 228—1 |
| 3,492,847 | 2/1970 | Ustyantsev et al. | 228—1 |
| 3,193,169 | 7/1965 | Arnold | 156—73 |

DANIEL J. FRITSCH, Primary Examiner

U.S. Cl. X.R.

156—73